E. J. BAISDEN.
RIM BEARING WHEEL.
APPLICATION FILED JAN. 22, 1909.
970,291.
Patented Sept. 13, 1910.
Fig. 1.
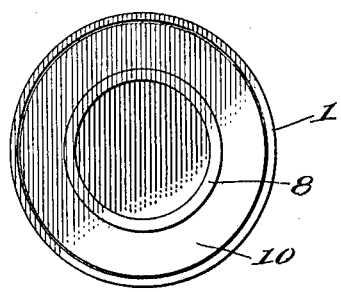
Fig. 2.
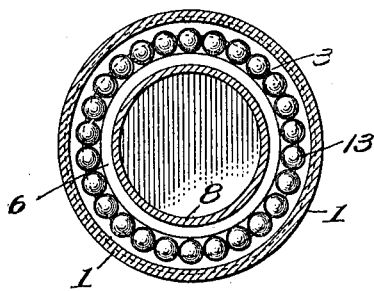
Fig. 3.
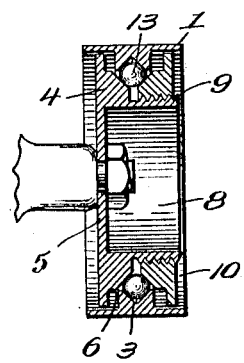
Fig. 5. Fig. 4. Fig. 6.
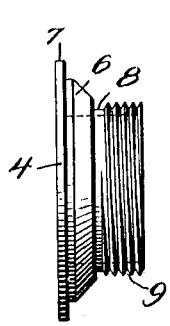 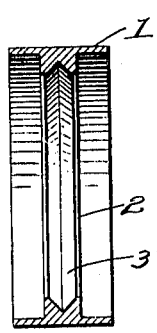 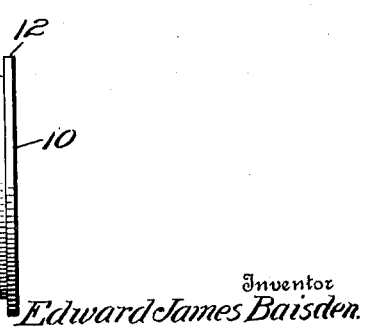
Inventor
Edward James Baisden.
Witnesses
F. C. Gibson.
J. W. Garner
By Victor J. Evans
Attorney

UNITED STATES PATENT OFFICE.

EDWARD JAMES BAISDEN, OF TOPEKA, KANSAS.

RIM-BEARING WHEEL.

970,291.

Specification of Letters Patent. Patented Sept. 13, 1910.

Application filed January 22, 1909. Serial No. 473,743.

*To all whom it may concern:*

Be it known that I, EDWARD JAMES BAISDEN, a citizen of the United States, residing at Topeka, in the county of Shawnee and State of Kansas, have invented new and useful Improvements in Rim-Bearing Wheels, of which the following is a specification.

This invention is an improved rim bearing wheel or roller especially adapted for use for roller skates, but also adapted for other analogous uses, the object of this invention being to provide a wheel or roller of this class which has ball bearings and which minimizes friction, is exceedingly strong and durable, may be readily manufactured at small cost and requires very little attention to keep it in perfect working order.

In the accompanying drawings:—Figure 1 is an elevation of a rim bearing wheel or roller constructed in accordance with this invention. Fig. 2 is a central sectional view of the same. Fig. 3 is a similar view at right angles to Fig. 2. Fig. 4 is a detail transverse sectional view of the rim or outer member. Fig. 5 is a detail elevation of the inner member. Fig. 6 is a similar view of the adjusting nut.

The outer, revoluble member or rim 1 which may be of any size, breadth and thickness is provided on its inner side at a point preferably midway between its sides with an inwardly extending annulus 2, the inner side of which is channeled as at 3, the sides of said channel being here shown as at right angles to each other and the said channel being of suitable depth and breadth.

The inner, fixed or hub member 4 is cylindrical in form closed at one side as at 5 and provided at said closed side with a truncated conical portion 6 at the base or outer side of which is a flange 7. The main or central portion 8 of said inner member is of reduced diameter as compared with the closed side 5 thereof, is cylindrical in form and is provided with an exterior screw thread 9. A nut 10 or adjusting member is screwed on said threaded cylindrical portion 8 of the inner member, has a truncated conical portion 11 on its inner side disposed in reverse relation to the truncated conical portion 6 of the inner member 4 and said nut or adjusting member has at its outer side, corresponding to the base of said conical portion 11 a flange 12 of the same diameter as the flange 7 of the inner member 4. The said flanges closely approach the inner surface of the revoluble outer or rim member as it will be observed upon reference to Fig. 3 and the opposing sides of the conical portions 6, 11, together with those of the channel 3 in the rim member, form an annular ball race in which are located the bearing balls 13.

It will be understood that access to the bearing balls to enable them to be assembled, removed or replaced when worn or injured may be readily obtained by first unscrewing the nut 10 and it will also be understood that the said nut forms an adjusting member for taking up wear incident to friction between the bearing balls and the sides of the ball race.

In practice as where my improved rim bearing wheel or roller is used on a roller skate, one end of the axle or other support will be secured in the socket formed on the inner side of the cylindrical portion 8 of the inner fixed or hub member. It will be understood that said inner member does not rotate and that the outer or rim member rotates, together with the bearing balls and that said bearing balls described orbital motion around the inner member and hence friction between the inner and rim members is minimized to the fullest extent.

What is claimed is:—

The herein described rim bearing wheel or roller comprising a revoluble cylindrical rim having an annulus on its inner side midway between its side edges, said annulus being provided with a channel in its inner peripheral face, an inner fixed or hub member cylindrical in form, closed at one side and open at the other side and forming a socket for the reception of a support, said inner member being provided at the closed side thereof with a truncated conical portion and a flange at the base or outer side of said truncated conical portion, said inner member being further provided with an adjusting member secured thereon and having a conical portion and a flange at the base of said conical portion, the flanges of said hub member and said adjusting member being disposed on opposite sides of and in close proximity to the annulus of the cylindrical rim, the width of the said cylindrical rim being such that its sides lie without the hub member and the adjusting member and bearing balls in the ball race formed by the channel of the said annulus of the rim and the opposing surfaces of said conical portions of the hub member and adjusting member.

In testimony whereof I affix my signature in presence of two witnesses.

EDWARD JAMES BAISDEN.

Witnesses:
　Wm. T. Bohn,
　A. Marshall.